United States Patent
Young et al.

(10) Patent No.: US 12,338,301 B2
(45) Date of Patent: Jun. 24, 2025

(54) BIMODAL CATALYST SYSTEMS

(71) Applicant: Dow Global Technologies LLC, Midland, MI (US)

(72) Inventors: Andrew J. Young, Houston, TX (US); Roger L. Kuhlman, Lake Jackson, TX (US); Angela I. Padilla-Acevedo, Lake Jackson, TX (US); John F. Szul, Hurricane, WV (US)

(73) Assignee: Dow Global Technologies LLC, Midland, MI (US)

( * ) Notice: Subject to any disclaimer, the term of this patent is extended or adjusted under 35 U.S.C. 154(b) by 649 days.

(21) Appl. No.: 17/771,835

(22) PCT Filed: Nov. 4, 2020

(86) PCT No.: PCT/US2020/058855
§ 371 (c)(1),
(2) Date: Apr. 26, 2022

(87) PCT Pub. No.: WO2021/091994
PCT Pub. Date: May 14, 2021

(65) Prior Publication Data
US 2022/0411546 A1    Dec. 29, 2022

Related U.S. Application Data

(60) Provisional application No. 62/930,450, filed on Nov. 4, 2019.

(51) Int. Cl.
| | | |
|---|---|---|
| C08F 4/64 | (2006.01) | |
| C08F 4/02 | (2006.01) | |
| C08F 4/6592 | (2006.01) | |
| C08F 4/76 | (2006.01) | |
| C08F 10/02 | (2006.01) | |
| C08F 210/02 | (2006.01) | |

(52) U.S. Cl.
CPC .............. *C08F 210/02* (2013.01); *C08F 4/02* (2013.01); *C08F 4/64193* (2013.01); *C08F 4/6592* (2013.01); *C08F 4/76* (2013.01); *C08F 2420/04* (2013.01); *C08F 2500/05* (2013.01)

(58) Field of Classification Search
CPC ........................... C08F 4/6592; C08F 4/64193
See application file for complete search history.

(56) References Cited

U.S. PATENT DOCUMENTS

| | | | |
|---|---|---|---|
| 8,088,704 B2 * | 1/2012 | Kolb | C08F 10/00 |
| | | | 502/103 |
| 8,835,577 B2 | 9/2014 | Rix et al. | |
| 9,234,060 B2 * | 1/2016 | Kao | B01J 31/143 |
| 10,253,173 B2 | 4/2019 | Canich et al. | |
| 10,544,244 B2 * | 1/2020 | Faler | C08F 210/16 |
| 10,654,029 B2 | 5/2020 | Faler et al. | |
| 11,155,658 B2 * | 10/2021 | Carnahan | C08F 4/65904 |
| 11,193,008 B2 * | 12/2021 | Lue | C08F 210/16 |
| 2008/0287617 A1 | 11/2008 | Holtcamp | |
| 2009/0306323 A1 | 12/2009 | Kolb et al. | |
| 2010/0261861 A1 | 10/2010 | Kolb et al. | |
| 2012/0116034 A1 | 5/2012 | Oswald et al. | |
| 2013/0144018 A1 | 6/2013 | Klosin et al. | |
| 2015/0166699 A1 | 6/2015 | Kao et al. | |
| 2015/0291713 A1 | 10/2015 | Klosin et al. | |
| 2015/0337062 A1 | 11/2015 | Demirors et al. | |
| 2016/0108156 A1 | 4/2016 | Klosin et al. | |
| 2018/0265604 A1 | 9/2018 | Figueroa et al. | |
| 2018/0282452 A1 | 10/2018 | Fontaine et al. | |
| 2018/0298128 A1 | 10/2018 | Harlan et al. | |
| 2019/0275506 A1 | 9/2019 | Carpenter et al. | |
| 2019/0276573 A1 | 9/2019 | Carnahan et al. | |
| 2020/0056026 A1 | 2/2020 | Lue et al. | |

OTHER PUBLICATIONS

International Search Report & Written Opinion for related PCT Application PCT/US2020/058855, mailed Feb. 16, 2021 (15 pgs).
International Preliminary Report on Patentability for related PCT Application PCT/US2020/058855, mailed May 19, 2022 (10 pgs).

\* cited by examiner

*Primary Examiner* — Rip A Lee

(57) ABSTRACT

Embodiments provide bimodal polymerization catalyst systems comprising metallocene olefin polymerization catalysts and biphenylphenol polymerization catalysts made from biphenylphenol polymerization precatalysts of Formula I.

13 Claims, No Drawings

BIMODAL CATALYST SYSTEMS

This application is a National Stage Application under 35 U.S.C. § 371 of International Application Number PCT/US2020/058855, filed Nov. 4, 2020 and published as WO 2021/091994 on May 14, 2021, which claims the benefit to U.S. Provisional Application 62/930,450, filed Nov. 4, 2019, the entire contents of which are incorporated herein by reference in its entirety

FIELD OF DISCLOSURE

Embodiments of the present disclosure are directed towards bimodal catalyst systems, more specifically, bimodal catalyst systems that may be utilized to make bimodal polyethylene compositions comprising a high molecular weight polyethylene component and a low molecular weight polyethylene component in a single gas-phase reactor.

BACKGROUND

Polymers may be utilized for a number of products including as films, fibers, nonwoven and/or woven fabrics, extruded articles, and/or molded articles, among others. Polymers can be made by reacting one or more types of monomer in a polymerization reaction in the presence of a polymerization catalyst.

SUMMARY

The present disclosure provides various embodiments, including:

A bimodal polymerization catalyst system comprising: a metallocene olefin polymerization catalyst; and a biphenylphenol polymerization catalyst made from a biphenylphenol polymerization precatalyst of Formula I:

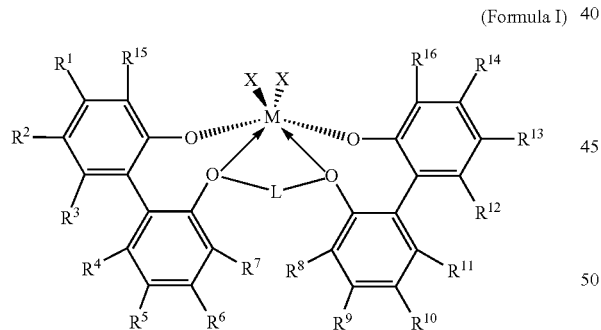

(Formula I)

wherein each of $R^7$ and $R^8$ is independently a $C_1$ to $C_{20}$ alkyl, aryl or aralkyl, halogen, or a hydrogen; wherein each of $R^5$ and $R^{10}$ is independently a $C_1$ to $C_{20}$ alkyl, aryl, aralkyl, halogen, an alkyl-or aryl-substituted silyl, or a hydrogen; wherein each of $R^2$ and $R^{13}$ is independently a $C_1$ to $C_{20}$ alkyl, aryl or aralkyl or a hydrogen; wherein each of $R^{15}$ and $R^{16}$ is independently a 2,7-disubstituted carbazol-9-yl; wherein L is a saturated $C_2$-$C_3$ alkyl that forms a 2-carbon bridge or 3-carbon bridge between the two oxygen atoms to which L is bonded; wherein each X is independently halogen, a hydrogen, a $(C_1$-$C_{20})$alkyl, a $(C_7$-$C_{20})$aralkyl, a $(C_1$-$C_6)$alkyl-substituted $(C_6$-$C_{12})$aryl, or a $(C_1$-$C_6)$alkyl-substituted benzyl, —$CH_2Si(R^c)_3$, where $R^c$ is $C_1$-$C_{12}$ hydrocarbon; wherein each of $R^1$, $R^3$, $R^4$, $R^6$, $R^9$, $R^{11}$, $R^{12}$, and $R^{14}$ is independently a hydrogen; and wherein M is a heteroatom selected from a group consisting of Zr and Hf;

A method of making a bimodal polyethylene composition comprising a high molecular weight polyethylene component and a low molecular weight polyethylene component, wherein the high and low molecular weight polyethylene components are made together in a single gas-phase reactor via a polymerization process employing the bimodal polymerization catalyst system, wherein the bimodal polyethylene composition has a value of the weight average molecular weight (Mw) to number average molecular weight (Mn) ratio (Mw/Mn) that is greater than 5.00; a value of an z-average molecular weight (Mz) to weight average molecular weight (Mw) ratio (Mz/Mw) that is less than the Mw/Mn; or both the Mw/Mn greater than 5.00 and a Mz/Mw less than the Mw/Mn; and A method of making the bimodal polymerization catalyst system, the method comprising making the biphenylphenol polymerization catalyst by contacting, under activating conditions, the biphenylphenol polymerization precatalyst of Formula I with an activator, as detailed herein.

DETAILED DESCRIPTION

The bimodal polymerization catalyst system comprising: a metallocene olefin polymerization catalyst; and a biphenylphenol polymerization catalyst made from a biphenylphenol polymerization precatalyst of Formula I:

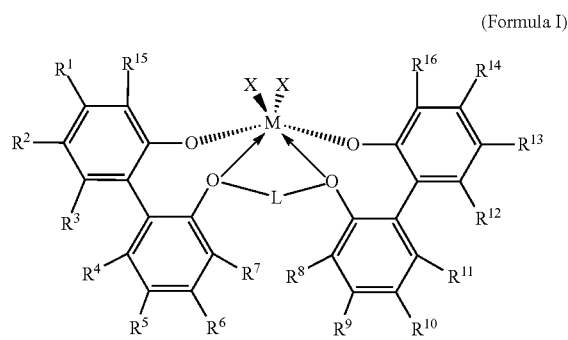

(Formula I)

wherein each of $R^7$ and $R^8$ is independently a $C_1$ to $C_{20}$ alkyl, aryl or aralkyl, halogen, or a hydrogen; wherein each of $R^5$ and $R^{10}$ is independently a $C_1$ to $C_{20}$ alkyl, aryl, aralkyl, halogen, an alkyl-or aryl-substituted silyl, or a hydrogen; wherein each of $R^2$ and $R^{13}$ is independently a $C_1$ to $C_{20}$ alkyl, aryl or aralkyl or a hydrogen; wherein each of $R^{15}$ and $R^{16}$ is independently a 2,7-disubstituted carbazol-9-yl; wherein L is a saturated $C_2$-$C_3$ alkyl that forms a 2-carbon bridge or 3-carbon bridge between the two oxygen atoms to which L is bonded; wherein each X is independently halogen, a hydrogen, a $(C_1$-$C_{20})$alkyl, a $(C_7$-$C_{20})$aralkyl, a $(C_1$-$C_6)$alkyl-substituted $(C_6$-$C_{12})$aryl, or a $(C_1$-$C_6)$alkyl-substituted benzyl, —$CH_2Si(R^c)_3$, where $R^c$ is $C_1$-$C_{12}$ hydrocarbon; wherein each of $R^1$, $R^3$, $R^4$, $R^6$, $R^9$, $R^{11}$, $R^{12}$, and $R^{14}$ is independently a hydrogen; and wherein M is a heteroatom selected from a group consisting of Zr and Hf.

The biphenylphenol polymerization precatalyst represented by the Formula I (i.e., the biphenylphenol polymerization precatalyst), as described herein, may be utilized to make biphenylphenol polymerization catalysts. For instance, the biphenylphenol polymerization precatalyst represent by the Formula I may be contacted, under activating conditions, with an activator so as to activate the biphenylphenol polymerization precatalyst represent by the Formula I, thereby making the biphenylphenol polymerization catalyst.

As mentioned, each of $R^7$ and $R^8$ as shown in Formula I, can independently be a $C_1$ to $C_{20}$ alkyl, aryl or aralkyl, halogen, or a hydrogen. One or more embodiments provide that each of $R^7$ and $R^8$ is a $C_1$ alkyl, e.g. methyl.

As used herein, an "alkyl" includes linear, branched and cyclic paraffin radicals that are deficient by one hydrogen. Thus, for example, a $CH_3$ group ("methyl") and a $CH_3CH_2$ group ("ethyl") are examples of alkyls.

As used herein, "aryl" includes phenyl, naphthyl, pyridyl and other radicals whose molecules have the ring structure characteristic of benzene, naphthylene, phenanthrene, anthracene, etc. It is understood that an "aryl" can be a $C_6$ to $C_{20}$ aryl. For example, a $C_6H_5$—aromatic structure is a "phenyl", a $C_6H_4$—aromatic structure is a "phenylene". As used herein, an "aralkyl", which can also be called an "arylalkyl, is an alkyl having an aryl pendant therefrom. It is understood that an "aralkyl" can be a $C_7$ to $C_{20}$ aralkyl. An "alkylaryl" is an aryl having one or more alkyls pendant therefrom. As used herein, a "hydrocarbyl" includes aliphatic, cyclic, olefinic, acetylenic and aromatic radicals (i.e., hydrocarbon radicals) comprising hydrogen and carbon that are deficient by one hydrogen.

As mentioned, each of $R^5$ and $R^{10}$ as shown in Formula I, can independently be a $C_1$ to $C_{20}$ alkyl, aryl, aralkyl, halogen, an alkyl-or aryl-substituted silyl, or a hydrogen. For instance, one or more embodiments provide that $R^5$ and $R^{10}$ is a di-alkyl or tri-alkyl substituted silyl. One or more embodiments provide that each of $R^5$ and $R^{10}$ is an octyl dimethyl silyl.

As mentioned, each of $R^4$ and $R^{11}$ as shown in Formula I, can independently be a hydrogen or a halide such as fluorine. For instance, one or more embodiments provide that each of $R^4$ and $R^{11}$ is a hydrogen.

As mentioned, each of $R^2$ and $R^{13}$ as shown in Formula I, can independently be a $C_1$ to $C_{20}$ alkyl, aryl or aralkyl or a hydrogen. One or more embodiments provide that each of $R^2$ and $R^{13}$ is a $C_3$-$C_4$ alkyl such as n-butyl, t-butyl, or 2-methyl-pentyl. One or more embodiments provide that each of $R^2$ and $R^{13}$ is a 1,1,3,3-tetramethylbutyl.

As mentioned, each of $R^{15}$ and $R^{16}$ as shown in Formula I, can be a 2,7-disubstituted carbazol-9-yl. For instance, one or more embodiments provide that each of $R^{15}$ and $R^{16}$ is a 2,7-disubstituted carbazol-9-yl selected from a group consisting of a 2,7-di-t-butylcarbazol-9-yl, a 2,7-diethylcarbazol-9-yl, a 2,7-dimethylcarbazol-9-yl, and a 2,7-bis(diisopropyl(n-octyl)silyl)-carbazol-9-yl.

As mentioned, L, as shown in Formula I, can be a saturated $C_2$-$C_3$ alkyl that forms a 2-carbon or 3-carbon bridge between the two oxygen atoms to which L is bonded. For instance, one or more embodiments provide that L is a saturated $C_3$ alkyl that forms a bridge between the two oxygen atoms to which L is bonded. The term "saturated" means lacking carbon—carbon double bonds, carbon—carbon triple bonds, and (in heteroatom—containing groups) carbon—nitrogen, carbon—phosphorous, and carbon—silicon double or triple bonds.

As mentioned, each X, as shown in Formula I, can independently be a halogen, a hydrogen, a $(C_1$-$C_{20})$alkyl, a $(C_7$-$C_{20})$aralkyl, a $(C_1$-$C_6)$alkyl-substituted $(C_6$-$C_{12})$aryl, or a $(C_1$-$C_6)$alkyl-substituted benzyl, —$CH_2Si(R^c)_3$, where $R^c$ is $C_1$-$C_{12}$ hydrocarbon. For instance, one or more embodiments provide that each X is a $C_1$ alkyl.

As mentioned, M, as shown in Formula I, is a heteroatom such as a metal atom. In some embodiments, M can be selected from a group consisting of Zr and Hf. One or more embodiments provide that M is zirconium. One or more embodiments provide that M is hafnium.

Each of the R groups ($R^1$-$R^{16}$) and the X's of Formula I, as described herein, can independently be substituted or unsubstituted. For instance, in some embodiments, each of the X's of Formula I can independently be a $(C_1$-$C_6)$alkyl-substituted $(C_6$-$C_{12})$aryl, or a $(C_1$-$C_6)$alkyl-substituted benzyl. As used herein, "substituted" indicates that the group following that term possesses at least one moiety in place of one or more hydrogens in any position, the moieties selected from such groups as halogen radicals, hydroxyl groups, carbonyl groups, carboxyl groups, amine groups, phosphine groups, alkoxy groups, phenyl groups, naphthyl groups, $C_1$ to $C_{20}$ alkyl groups, $C_2$ to $C_{10}$ alkenyl groups, and combinations thereof. Being "disubstituted" refers to the presence of two or more substituent groups in any position, the moieties selected from such groups as halogen radicals, hydroxyl groups, carbonyl groups, carboxyl groups, amine groups, phosphine groups, alkoxy groups, phenyl groups, naphthyl groups, $C_1$ to $C_{20}$ alkyl groups, $C_2$ to $C_{10}$ alkenyl groups, and combinations thereof.

The metallocene olefin polymerization catalyst and a biphenylphenol polymerization catalyst made from a biphenylphenol polymerization precatalyst herein can be made utilizing reactants mentioned herein. The metallocene olefin polymerization catalyst and a biphenylphenol polymerization catalyst made from a biphenylphenol polymerization precatalyst herein can be made by a number of processes, e.g. with conventional solvents, reaction conditions, reaction times, and isolation procedures, utilized for making known catalysts such as known metallocene olefin polymerization catalysts.

One or more embodiments provide a polymerization catalyst, namely a biphenylphenol polymerization catalyst made from a biphenylphenol polymerization precatalyst of Formula I. The biphenylphenol polymerization catalyst can be made by contacting, under activating conditions, the biphenylphenol polymerization precatalysts and an activator to provide the biphenylphenol polymerization catalyst, e.g. an activated biphenylphenol polymerization precatalyst. Activating conditions are well known in the art.

As used herein, "activator" refers to any compound or combination of compounds, supported, or unsupported, which can activate a complex or a catalyst component, such as by creating a cationic species of the catalyst component. For example, this can include the abstraction of at least one leaving group, e.g., the "X" group described herein, from the metal center of the complex/catalyst component, e.g. the metal complex of Formula I. As used herein, "leaving group" refers to one or more chemical moieties bound to a metal atom and that can be abstracted by an activator, thus producing a species active towards olefin polymerization.

The activator can include a Lewis acid or a non-coordinating ionic activator or ionizing activator, or any other compound including Lewis bases, aluminum alkyls, and/or conventional-type co-catalysts. In addition to methylaluminoxane ("MAO") and modified methylaluminoxane ("MMAO") mentioned above, illustrative activators can include, but are not limited to, aluminoxane or modified aluminoxane, and/or ionizing compounds, neutral or ionic, such as Dimethylanilinium tetrakis(pentafluorophenyl)borate, Triphenylcarbenium tetrakis(pentafluorophenyl)borate, Dimethylanilinium tetrakis(3,5-$(CF_3)_2$phenyl)borate, Triphenylcarbenium tetrakis(3,5-$(CF_3)_2$phenyl)borate, Dimethylanilinium tetrakis(perfluoronapthyl)borate, Triphenylcarbenium tetrakis(perfluoronapthyl)borate, Dimethylanilinium tetrakis(pentafluorophenyl)aluminate, Triphenylcarbenium tetrakis(pentafluorophenyl)aluminate, Dimethylanilinium tetrakis(perfluoronapthyl)aluminate, Triphenylcarbenium tetrakis(perfluoronapthyl)aluminate, a tris(perfluorophenyl) boron, a tris(perfluoronaphthyl)boron, tris(perfluorophenyl) aluminum, a tris(perfluoronaphthyl)aluminum or any combinations thereof.

Aluminoxanes can be described as oligomeric aluminum compounds having—Al(R)—O—subunits, where R is an alkyl group. Examples of aluminoxanes include, but are not limited to, methylaluminoxane ("MAO"), modified methylaluminoxane ("MMAO"), ethylaluminoxane, isobutylaluminoxane, or a combination thereof. Aluminoxanes can be produced by the hydrolysis of the respective trialkylaluminum compound. MMAO can be produced by the hydrolysis of trimethylaluminum and a higher trialkylaluminum, such as triisobutylaluminum. There are a variety of known methods for preparing aluminoxane and modified aluminoxanes. The aluminoxane can include a modified methyl aluminoxane ("MMAO") type 3A (commercially available from Akzo Chemicals, Inc. under the trade name Modified Methylaluminoxane type 3A, discussed in U.S. Pat. No. 5,041,584). A source of MAO can be a solution having from about 1 wt. % to about a 50 wt. % MAO, for example. Commercially available MAO solutions can include the 10 wt. % and 30 wt. % MAO solutions available from Albemarle Corporation, of Baton Rouge, La.

One or more organo-aluminum compounds, such as one or more alkylaluminum compound, can be used in conjunction with the aluminoxanes. Examples of alkylaluminum compounds include, but are not limited to, diethylaluminum ethoxide, diethylaluminum chloride, diisobutylaluminum hydride, and combinations thereof. Examples of other alkylaluminum compounds, e.g., trialkylaluminum compounds include, but are not limited to, trimethylaluminum, triethylaluminum ("TEAL"), triisobutylaluminum ("TiBAl"), tri-n-hexylaluminum, tri-n-octylaluminum, tripropylaluminum, tributylaluminum, and combinations thereof.

The metallocene olefin polymerization catalyst can be any metallocene olefin polymerization catalyst. In one or more embodiments, the metallocene olefin polymerization catalyst is selected from the group consisting of: (pentamethylcyclopentadienyl)(propylcyclopentadienyl)MX$_2$, (tetramethylcyclopentadienyl)(propylcyclopentadienyl)MX$_2$, (tetramethylcyclopentadienyl)(butylcyclopentadienyl)MX$_2$, Me$_2$Si(indenyl)$_2$MX$_2$, Me$_2$Si(tetrahydroindenyl)$_2$MX$_2$, (n-propyl cyclopentadienyl)$_2$MX$_2$, (n-butyl cyclopentadienyl)$_2$MX$_2$,(1-methyl, 3-butyl cyclopentadienyl)$_2$MX$_2$, HN(CH$_2$CH$_2$N(2,4,6-Me$_3$phenyl))$_2$MX$_2$, HN(CH$_2$CH$_2$N(2,3,4,5,6-Me$_5$phenyl))$_2$MX$_2$, (propyl cyclopentadienyl)(tetramethylcyclopentadienyl)MX$_2$, (butyl cyclopentadienyl)$_2$MX$_2$, (propyl cyclopentadienyl)$_2$MX$_2$, and mixtures thereof, where M is Zr or Hf, and X is selected from F, Cl, Br, I, Me, benzyl, CH$_2$SiMe$_3$, and C$_1$ to C$_5$ alkyls or alkenyls. In one or more embodiments the metallocene olefin polymerization catalyst is selected from the group consisting of bis(indenyl)zirconium dichloride, (pentamethylcyclopentadienyl)(n-propylcyclopentadienyl)zirconium dichloride, or (tetramethylcyclopentadienyl)(n-propylcyclopentadienyl)zirconium dichloride.

The bimodal polymerization catalyst system comprising a metallocene olefin polymerization catalyst; and a biphenylphenol polymerization catalyst made from a biphenylphenol polymerization precatalyst, can be utilized to make a polymer. For instance, the bimodal polymerization catalyst system and an olefin can be contacted under polymerization conditions to make a polymer, e.g., a polyolefin polymer.

As used herein a "polymer" has two or more of the same or different polymer units derived from one or more different monomers, e.g., homopolymers, copolymers, terpolymers, etc. A "homopolymer" is a polymer having polymer units that are the same. A "copolymer" is a polymer having two or more polymer units that are different from each other. A "terpolymer" is a polymer having three polymer units that are different from each other. "Different" in reference to polymer units indicates that the polymer units differ from each other by at least one atom or are different isomerically. Accordingly, the definition of copolymer, as used herein, includes terpolymers and the like. As used herein a "polymerization process" is a process that is utilized to make a polymer.

Embodiments provide that the polymer can be a polyolefin polymer. As used herein an "olefin," which may be referred to as an "alkene," refers to a linear, branched, or cyclic compound including carbon and hydrogen and having at least one double bond. As used herein, when a polymer or copolymer is referred to as comprising, e.g., being made from, an olefin, the olefin present in such polymer or copolymer is the polymerized form of the olefin. For example, when a copolymer is said to have an ethylene content of 1 wt % to 99 wt %, it is understood that the polymer unit in the copolymer is derived from ethylene in the polymerization reaction and the derived units are present at 1 wt % to 99 wt %, based upon the total weight of the polymer. A higher α-olefin refers to an α-olefin having 3 or more carbon atoms.

Polyolefins include polymers made from olefin monomers such as ethylene, i.e., polyethylene, and linear or branched higher alpha-olefin monomers containing 3 to 20 carbon atoms. Examples of higher alpha-olefin monomers include, but are not limited to, propylene, 1-butene, 1-pentene, 1-hexene, 4-methyl-1-pentene, 1-octene, and 3,5,5-trimethyl-1-hexene. Examples of polyolefins include ethylene-based polymers, having at least 50 wt % ethylene, including ethylene-1-butene, ethylene-1-hexene, and ethylene-1-octene copolymers, among others. Other olefins that may be utilized include ethylenically unsaturated monomers, diolefins having 4 to 18 carbon atoms, conjugated or nonconjugated dienes, polyenes, vinyl monomers and cyclic olefins, for example. Examples of the monomers may include, but are not limited to, norbornene, norbornadiene, isobutylene, isoprene, vinylbenzocyclobutane, styrenes, alkyl substituted styrene, ethylidene norbornene, dicyclopentadiene and cyclopentene. In a number of embodiments, a copolymer of ethylene can be produced, where with ethylene, a comonomer having at least one alpha-olefin having from 4 to 15 carbon atoms, preferably from 4 to 12 carbon atoms, and most preferably from 4 to 8 carbon atoms, is polymerized, e.g., in a gas phase polymerization process. In another embodiment, ethylene and/or propylene can be polymerized with at least two different comonomers, optionally one of which may be a diene, to make a terpolymer.

One or more embodiments provide that the polymer can include from 1 to 100 wt % of units derived from ethylene based on a total weight of the polymer. All individual values and subranges from 1 to 100 wt % are included; for example, the polymer can include from a lower limit of 1, 5, 10, or 50 wt % of units derived from ethylene to an upper limit of 100, 95, 90, 85, or 75 wt % of units derived from ethylene based on the total weight of the polymer.

As mentioned, surprisingly, the bimodal polymerization catalyst system including a biphenylphenol polymerization catalyst made from a biphenylphenol polymerization precatalyst of Formula I can help to provide polymers via a polymerization process in a single gas-phase reactor. In one or more embodiments, the resultant polymers can have at least a high molecular weight polyethylene component and a low molecular weight polyethylene component, as detailed herein. In one or more embodiments the resultant polymer can be a bimodal polymer such as a bimodal polyethylene composition comprising a high molecular weight polyethylene component and a low molecular weight polyethylene component, wherein the high and low molecular weight polyethylene components are formed together in a single gas-phase reactor via a polymerization process employing the bimodal polymerization catalyst system. Having a high molecular weight polyethylene component and a low molecular weight polyethylene component is desirable in some applications.

Surprisingly, the bimodal polymerization catalyst system including a biphenylphenol polymerization catalyst made from a biphenylphenol polymerization precatalyst of Formula I of the disclosure can produce bimodal polymers including high molecular weight polyethylene components that have a lower molecular weight as compared to high molecular weight components in bimodal polymers formed with other (non-inventive) polymerization catalysts at similar polymerization conditions, as detailed herein. High molecular weight polyethylene components having a lower molecular weight than other high molecular weight polyethylene components are desirable in some applications.

Embodiments provide that the polymer can have an overall Mn (number average molecular weight) from 8,000 to 50,000. All individual values and subranges from 8,000 to 50,000 are included; for example, the polymer can have an overall Mn from a lower limit of 8,000; 10,000; or 12,000; to an upper limit of 50,000; 40,000; or 35,000. In some embodiments the overall Mn can be in a range from 12,170 to 30,958.

Embodiments provide that the polymer can have an overall Mw (weight average molecular weight) from 50,000 to 1,000,000. All individual values and subranges from 100,000 to 1,000,000 are included; for example, the polymer can have an overall Mw from a lower limit of 50,000; 100,000; or 200,000; to an upper limit of 1,000,000; 800,000; or 600,000. In some embodiments the overall Mw can be in a range from 218,937 to 529,748.

Embodiments provide that the polymer can have an overall Mz (z-average molecular weight) from 200,000 to 10,000,000. All individual values and subranges from 200,000 to 10,000,000 are included; for example, the polymer can have an overall Mz from a lower limit of 200,000; 700,000; or 900,000; to an upper limit of 10,000,000; 5,000,000; or 3,000,000. In some embodiments the overall Mz can be in a range from 945,368 to 2,645,720.

Embodiments provide that the polymer can have an overall Mz to Mw ratio in a range of from 2.00 to 20.00. All individual values and subranges from 2.00 to 20.00 are included; for example, the polymer can have an overall Mz to Mw ratio from a lower limit of 2.00; 3.00; or 4.00 to an upper limit of 20.00, 15.00, or 10.00. In some embodiments, the polymer can have an overall Mz to Mw ratio of 4.32 to 8.21.

In some embodiments, the polymer can have a value of Mw to Mn ratio that is greater than 5.00. For instance, embodiments provide that the polymer can have an overall Mw to Mn ratio in a range of from 5.00 to 75.00. All individual values and subranges from 5.00 to 75.00 are included; for example, the polymer can have a Mw to Mn ratio from a lower limit of 5.00; 6.00; or 7.00 to an upper limit of 75.00, 60.00, or 50.00. In some embodiments, the polymer can have an overall Mw to Mn ratio of 8.95 to 43.53.

Embodiments provide that the polymer can have an overall Mz to Mw ratio that is less than an overall Mw to Mn ratio of the polymer.

Embodiments provide that the polymer can have a melt index ($I_{21}$) as measured by ASTM D1238 (at 190° C., 21 kg load) in the range from 0.001 dg/1 min to 1000 dg/1 min. All individual values and subranges from 0.001 dg/1 min to 1000 dg/1 min are included. For instance, the polymers can have a melt index ($I_{21}$) from 1.49 dg/1 min to 7.93 dg/1 min.

Embodiments provide that the polymer can have a density of from 0.890 g/cm$^3$ to 0.970 g/cm$^3$. All individual values and subranges from 0.890 to 0.970 g/cm$^3$ are included; for example, the polymer can have a density from a lower limit of 0.890, 0.900, 0.910, 0.920, or 0.940 g/cm$^3$ to an upper limit of 0.970, 0.960, or 0.950 g/cm$^3$. Density can be determined in accordance with ASTM D-792-13, *Standard Test Methods for Density and Specific Gravity (Relative Density) of Plastics by Displacement*, Method B (for testing solid plastics in liquids other than water, e.g., in liquid 2-propanol). Report results in units of grams per cubic centimeter (g/cm$^3$).

Gel permeation chromatography (GPC) Test Method: Weight-Average Molecular Weight Test Method: determine $M_w$, number-average molecular weight ($M_n$), and $M_w/M_n$ using chromatograms obtained on a High Temperature Gel Permeation Chromatography instrument (HTGPC, Polymer Laboratories). The HTGPC is equipped with transfer lines, a differential refractive index detector (DRI), and three Polymer Laboratories PLgel 10 µm Mixed-B columns, all contained in an oven maintained at 160° C. Method uses a solvent composed of BHT-treated TCB at nominal flow rate of 1.0 milliliter per minute (mL/min.) and a nominal injection volume of 300 microliters (µL). Prepare the solvent by dissolving 6 grams of butylated hydroxytoluene (BHT, antioxidant) in 4 liters (L) of reagent grade 1,2,4-trichlorobenzene (TCB), and filtering the resulting solution through a 0.1 micrometer (µm) Teflon filter to give the solvent. Degas the solvent with an inline degasser before it enters the HTGPC instrument. Calibrate the columns with a series of monodispersed polystyrene (PS) standards. Separately, prepare known concentrations of test polymer dissolved in solvent by heating known amounts thereof in known volumes of solvent at 160° C. with continuous shaking for 2 hours to give solutions. (Measure all quantities gravimetrically.) Target solution concentrations, c, of test polymer of from 0.5 to 2.0 milligrams polymer per milliliter solution (mg/mL), with lower concentrations, c, being used for higher molecular weight polymers. Prior to running each sample, purge the DRI detector. Then increase flow rate in the apparatus to 1.0 mL/min/, and allow the DRI detector to stabilize for 8 hours before injecting the first sample. Calculate $M_w$ and $M_n$ using universal calibration relationships with the column calibrations. Calculate MW at each elution volume with following equation:

$$\log M_x = \frac{\log(K_X/K_{PS})}{a_X + 1} + \frac{a_{PS} + 1}{a_X + 1} \log M_{PS},$$

where subscript "X" stands for the test sample, subscript "PS" stands for PS standards, $\alpha_{PS}$=0.67, $K_{PS}$=0.000175, and $\alpha_X$ and $K_X$ are obtained from published literature. For polyethylenes, $a_x/K_x$=0.695/0.000579. For polypropylenes $a_x/K_x$=0.705/0.0002288. At each point in the resulting chromatogram, calculate concentration, c, from a baseline-subtracted DRI signal, $I_{DRI}$, using the following equation: $c=K_{DRI}I_{DRI}/(dn/dc)$, wherein $K_{DRI}$ is a constant determined by calibrating the DRI, /indicates division, and dn/dc is the refractive index increment for the polymer. For polyethylene, dn/dc=0.109. Calculate mass recovery of polymer from the ratio of the integrated area of the chromatogram of concentration chromatography over elution volume and the injection mass which is equal to the pre-determined concentration multiplied by injection loop volume. Report all molecular weights in grams per mole (g/mol) unless otherwise noted. Further details regarding methods of determining Mw, Mn, MWD are described in US 2006/0173123 page 24-25, paragraphs [0334] to [0341]. Plot of dW/d Log(MW) on the y-axis versus Log(MW) on the x-axis to give a GPC chromatogram, wherein Log(MW) and dW/d Log(MW) are as defined above.

The polymer can be utilized for a number of articles such as films, fibers, nonwoven and/or woven fabrics, extruded articles, and/or molded articles, among others.

Provided is bimodal polymerization catalyst system comprising: a metallocene olefin polymerization catalyst; and a biphenylphenol polymerization catalyst made from a biphenylphenol polymerization precatalyst of Formula I:

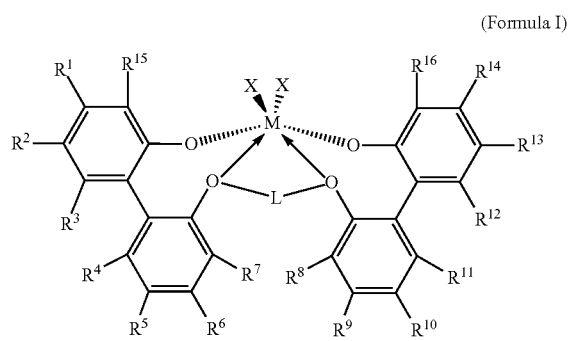

(Formula I)

wherein each of $R^7$ and $R^8$ is independently a $C_1$ to $C_{20}$ alkyl, aryl or aralkyl, halogen, or a hydrogen; wherein each of $R^5$ and $R^{10}$ is independently a $C_1$ to $C_{20}$ alkyl, aryl, aralkyl, halogen, an alkyl-or aryl-substituted silyl, or a hydrogen; wherein each of $R^2$ and $R^{13}$ is independently a $C_1$ to $C_{20}$ alkyl, aryl or aralkyl or a hydrogen; wherein each of $R^{15}$ and $R^{16}$ is independently a 2,7-disubstituted carbazol-9-yl; wherein L is a saturated $C_2$-$C_3$ alkyl that forms a 2-carbon bridge or 3-carbon bridge between the two oxygen atoms to which L is bonded; wherein each X is independently a halogen, a hydrogen, a $(C_1$-$C_{20})$alkyl, a $(C_7$-$C_{20})$aralkyl, a $(C_1$-$C_6)$alkyl-substituted $(C_6$-$C_{12})$aryl, or a $(C_1$-$C_6)$alkyl-substituted benzyl, $-CH_2Si(R^c)_3$, where $R^c$ is $C_1$-$C_{12}$ hydrocarbon; wherein each of $R^1$, $R^3$, $R^4$, $R^6$, $R^9$, $R^{11}$, $R^{12}$, and $R^{14}$ is independently a hydrogen; and wherein M is a heteroatom selected from a group consisting of Zr and Hf.

The metallocene olefin polymerization catalyst and/or a biphenylphenol polymerization catalyst made from a biphenylphenol polymerization precatalyst of Formula I, as well as other components discussed herein such as the activator, may be utilized with a support. A "support", which may also be referred to as a "carrier", refers to any support material, including a porous support material, such as talc, inorganic oxides, and inorganic chlorides.

The metallocene olefin polymerization catalyst and/or a biphenylphenol polymerization catalyst made from a biphenylphenol polymerization precatalyst of Formula I, as well as other components discussed herein, can be supported on the same or separate supports, or one or more of the components may be used in an unsupported form. Utilizing the support may be accomplished by any technique used in the art. One or more embodiments provide that a spray dry process is utilized. Spray dry processes are well known in the art. The support may be functionalized.

The support may be a porous support material, for example, talc, an inorganic oxide, or an inorganic chloride. Other support materials include resinous support materials, e.g., polystyrene, functionalized or crosslinked organic supports, such as polystyrene divinyl benzene polyolefins or polymeric compounds, zeolites, clays, or any other organic or inorganic support material and the like, or mixtures thereof.

Support materials include inorganic oxides that include Group 2, 3, 4, 5, 13 or 14 metal oxides. Some preferred supports include silica, fumed silica, alumina, silica-alumina, and mixtures thereof. Some other supports include magnesia, titania, zirconia, magnesium chloride, montmorillonite, phyllosilicate, zeolites, talc, clays) and the like. Also, combinations of these support materials may be used, for example, silica-chromium, silica- alumina, silica-titania and the like. Additional support materials may include porous acrylic polymers, nanocomposites, aerogels, spherulites, and polymeric beads.

An example of a support is fumed silica available under the trade name Cabosil™ TS-610, or other TS- or TG-series supports, available from Cabot Corporation. Fumed silica is typically a silica with particles 7 to 30 nanometers in size that has been treated with dimethylsilyldichloride such that a majority of the surface hydroxyl groups are capped. That is, in some instances, a silica support can support a metallocene olefin polymerization catalyst, a biphenylphenol polymerization catalyst made from a biphenylphenol polymerization precatalyst of Formula I, or a combination the metallocene olefin polymerization catalyst and the biphenylphenol polymerization catalyst made from a biphenylphenol polymerization precatalyst of Formula I. The silica support can be present in conventional amounts such as those described in WO 2019190897.

The support material may have a surface area in the range of from about 10 to about 700 m²/g, pore volume in the range of from about 0.1 to about 4.0 g/cm³ and average particle size in the range of from about 5 to about 500 μm. More preferably, the surface area of the support material is in the range of from about 50 to about 500 m²/g, pore volume of from about 0.5 to about 3.5 g/cm³ and average particle size of from about 10 to about 200 μm. Most preferably the surface area of the support material is in the range is from about 100 to about 400 m²/g, pore volume from about 0.8 to about 3.0 g/cm³ and average particle size is from about 5 to about 100 μm. The average pore size of the carrier typically has pore size in the range of from 10 to 1000 A, preferably 50 to about 500 A, and most preferably 75 to about 350 A.

The metallocene olefin polymerization catalyst and/or a biphenylphenol polymerization catalyst made from a biphenylphenol polymerization precatalyst of Formula I, as well as other components discussed herein such as the activator, may be slurried. Slurries are well known in the art. The slurry may include the metallocene olefin polymerization catalyst and/or a biphenylphenol polymerization catalyst made from a biphenylphenol polymerization precatalyst of Formula I, an activator, and a support, for instance.

A molar ratio of the activator to metal in a metallocene olefin polymerization catalyst or the biphenylphenol polymerization catalyst made from a biphenylphenol polymerization precatalyst of Formula I in the slurry may be 1000:1 to 0.5:1, 300:1 to 1:1, or 150:1 to 1:1. One or more diluents, e.g., fluids, can be used to facilitate the combination of any two or more components in the slurry. For example, the metallocene olefin polymerization catalyst and/or a biphenylphenol polymerization catalyst made from a biphenylphenol polymerization precatalyst of Formula I, and the activator can be combined together in the presence of toluene or another non-reactive hydrocarbon or hydrocarbon mixture. In addition to toluene, other suitable diluents can include, but are not limited to, ethylbenzene, xylene, pentane, hexane, heptane, octane, other hydrocarbons, or any combination thereof. The support, either dry or mixed with toluene can then be added to the mixture or the metal-ligand complex /activator can be added to the support. The slurry may be fed to the reactor for the polymerization process, and/or the slurry may be dried, e.g., spray-dried, prior to being fed to the reactor for the polymerization process.

The polymerization process may be a suspension polymerization process, and/or a gas phase polymerization process. The polymerization process may utilize using known equipment and reaction conditions, e.g., known polymerization conditions. The polymerization process is not limited to any specific type of polymerization system. As an example, polymerization temperatures may range from about 0° C. to about 300° C. at atmospheric, sub-atmospheric, or super-atmospheric pressures. In particular, slurry or solution polymerization systems may employ sub-atmospheric, or alternatively, super-atmospheric pressures, and temperatures in the range of about 40° C. to about 300° C. Embodiments provide a method of making a polyolefin polymer the method comprising: contacting, under polymerization conditions, an olefin with the bimodal polymerization catalyst system, as described herein, to polymerize the olefin, thereby making a polyolefin polymer.

One or more embodiments provide that the polymers may be formed via a gas phase polymerization system, at super-atmospheric pressures in the range from 0.07 to 68.9 bar, from 3.45 to 27.6 bar, or from 6.89 to 24.1 bar, and a temperature in the range from 30° C. to 130° C., from 65° C. to 110° C., from 75° C. to 120° C., or from 80° C. to 120° C. For one or more embodiments, operating temperatures may be less than 112° C. Stirred and/or fluidized bed gas phase polymerization systems may be utilized.

Generally, a conventional gas phase fluidized bed polymerization process can be conducted by passing a stream containing one or more olefin monomers continuously through a fluidized bed reactor under reaction conditions and in the presence of a catalytic composition, e.g., a composition including the bimodal polymerization catalyst system (a metallocene olefin polymerization catalyst and a biphenylphenol polymerization catalyst made from a biphenylphenol polymerization precatalyst of Formula I) and the activator, at a velocity sufficient to maintain a bed of solid particles in a suspended state. A stream comprising unreacted monomer can be continuously withdrawn from the reactor, compressed, cooled, optionally partially or fully condensed, and recycled back to the reactor. Product, i.e., polymer, can be withdrawn from the reactor and replacement monomer can be added to the recycle stream. Gases inert to the catalytic composition and reactants may also be present in the gas stream. The polymerization system may include a single reactor or two or more reactors in series, for example.

Feed streams for the polymerization process may include olefin monomer, non-olefinic gas such as nitrogen and/or hydrogen, and may further include one or more non-reactive alkanes that may be condensable in the polymerization process and used for removing the heat of reaction. Illustrative non-reactive alkanes include, but are not limited to, propane, butane, isobutane, pentane, isopentane, hexane, isomers thereof and derivatives thereof. Feeds may enter the reactor at a single or multiple and different locations.

For the polymerization process, polymerization catalyst (a metallocene olefin polymerization catalyst and/or a biphenylphenol polymerization catalyst made from a biphenylphenol polymerization precatalyst of Formula I) may be continusouly fed to the reactor. A gas that is inert to the polymerization catalyst, such as nitrogen or argon, can be used to carry the polymerization catalyst into the reactor bed. In one embodiment, the polymerization catalyst can be provided as a slurry in mineral oil or liquid hydrocarbon or mixture such, as for example, propane, butane, isopentane, hexane, heptane or octane. The slurry may be delivered to the reactor with a carrier fluid, such as, for example, nitrogen or argon or a liquid such as for example isopentane or other $C_3$ to $C_8$ alkanes.

For the polymerization process, hydrogen may be utilized at a gas mole ratio of hydrogen to ethylene in the reactor that can be in a range of about 0.0 to 1.0, in a range of 0.01 to 0.7, in a range of 0.03 to 0.5, in a range of 0.005 to 0.3, or in a range in a range of 0.0017 to 0.0068. A number of embodiments utilize hydrogen gas.

A number of aspects of the present disclosure are provided as follows.

Aspect 1 provides a bimodal polymerization catalyst system comprising: a metallocene olefin polymerization catalyst; and a biphenylphenol polymerization catalyst made from a biphenylphenol polymerization precatalyst of Formula I:

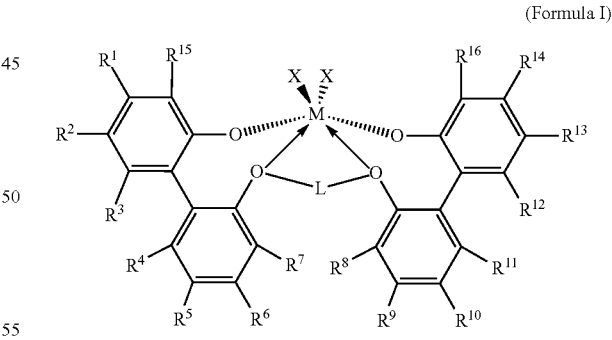

(Formula I)

wherein each of $R^7$ and $R^8$ is independently a $C_1$ to $C_{20}$ alkyl, aryl or aralkyl, halogen, or a hydrogen; wherein each of $R^5$ and $R^{10}$ is independently a $C_1$ to $C_{20}$ alkyl, aryl, aralkyl, halogen, an alkyl-or aryl-substituted silyl, or a hydrogen; wherein each of $R^2$ and $R^{13}$ is independently a $C_1$ to $C_{20}$ alkyl, aryl or aralkylor a hydrogen; wherein each of $R^{15}$ and $R^{16}$ is independently a 2,7-disubstituted carbazol-9-yl; wherein L is a saturated $C_2$-$C_3$ alkyl that forms a 2-carbon bridge or 3-carbon bridge between the two oxygen atoms to which L is bonded; wherein each X is independently halogen, a hydrogen, a $(C_1$-$C_{20})$alkyl, a $(C_7$-$C_{20})$aralkyl, a $(C_1$-

$C_6$)alkyl-substituted ($C_6$-$C_{12}$)aryl, or a ($C_1$-$C_6$)alkyl-substituted benzyl, —$CH_2Si(R^c)_3$, where $R^c$ is $C_1$-$C_{12}$ hydrocarbon; wherein each of $R^1$, $R^3$, $R^4$, $R^6$, $R^9$, $R^{11}$, $R^{12}$, and $R^{14}$ is independently a hydrogen; and wherein M is a heteroatom selected from a group consisting of Zr and Hf.

Aspect 2 provides the bimodal polymerization catalyst system of Aspect 1, wherein each of $R^7$ and $R^8$ is a $C_1$ alkyl.

Aspect 3 provides the bimodal polymerization catalyst system of Aspect 1, wherein each of $R^5$ and $R^{10}$ is a di-alkyl or tri-alkyl substituted silyl.

Aspect 4 provides the bimodal polymerization catalyst system of any one of Aspects 1-3, wherein each $R^2$ and $R^{13}$ is a 1,1-dimethylethyl.

Aspect 5 provides the bimodal polymerization catalyst system of any one of Aspects 1-4, wherein each of $R^{15}$ and $R^{16}$ is a 2,7-di-t-butylcarbazol-9-yl.

Aspect 6 bimodal polymerization catalyst system of any one of Aspects 1-5, wherein L is a saturated $C_3$ alkyl.

Aspect 7 provides the bimodal polymerization catalyst system of any one of Aspects 1-6, wherein each X is a $C_1$ alkyl.

Aspect 8 provides the bimodal polymerization catalyst system of any one of Aspects 1-7, wherein M is Zr.

Aspect 9 provides the bimodal polymerization catalyst system of any one of Aspects 1-8, wherein M is Hf.

Aspect 10 provides the bimodal polymerization catalyst system of any one of Aspects 1-9, wherein the metallocene olefin polymerization catalyst is made from a metallocene precatalyst selected from the group consisting of:
 (pentamethylcyclopentadienyl)(propylcyclopentadienyl)$MX_2$,
 (tetramethylcyclopentadienyl)(propylcyclopentadienyl)$MX_2$,
 (tetramethylcyclopentadienyl)(butylcyclopentadienyl)$MX_2$,
 (methylcyclopentadienyl)(1,3-dimethyl-tetrahydroindenyl)$MX_2$,
 (cyclopentadienyl)(1,3-dimethyl-tetrahydroindenyl)$MX_2$,
 (cyclopentadienyl)(4,7-dimethylindenyl)$MX_2$,
 (cyclopentadienyl)(1,5-dimethylindenyl)$MX_2$,
 (cyclopentadienyl)(1,4-dimethylindenyl)$MX_2$,
 $Me_2Si(indenyl)_2MX_2$,
 $Me_2Si(tetrahydroindenyl)_2MX_2$,
 (n-propyl cyclopentadienyl)$_2MX_2$,
 (n-butyl cyclopentadienyl)$_2MX_2$,
 (1-methyl, 3-butyl cyclopentadienyl)$_2MX_2$,
 $HN(CH_2CH_2N(2,4,6-Me_3phenyl))_2MX_2$,
 $HN(CH_2CH_2N(2,3,4,5,6-Me_5phenyl))_2MX_2$,
 (butyl cyclopentadienyl)$_2MX_2$,
 (propyl cyclopentadienyl)$_2MX_2$, and mixtures thereof,
 wherein M is Zr or Hf, and X is selected from F, Cl, Br, I, Me, benzyl, $CH_2SiMe_3$, and $C_1$ to $C_5$ alkyls or alkenyls.

Aspect 11 provides the bimodal polymerization catalyst system of any one of aspects 1-10, further comprising a silica support, which supports: (a) the metallocene olefin polymerization catalyst but not the biphenylphenol polymerization catalyst made from biphenylphenol polymerization precatalyst of Formula I, (b) the biphenylphenol polymerization catalyst made from the biphenylphenol polymerization precatalyst of Formula I, but not the metallocene olefin polymerization catalyst, or (c) a combination the metallocene olefin polymerization catalyst and the biphenylphenol polymerization catalyst made from a biphenylphenol polymerization precatalyst of Formula I (i.e., (c) is a supported bimodal polymerization catalyst system).

Aspect 12 provides a method of making a bimodal polyethylene composition comprising a high molecular weight polyethylene component and a low molecular weight polyethylene component, wherein the high and low molecular weight polyethylene components are made together in a single gas-phase reactor via a polymerization process employing the bimodal polymerization catalyst system of aspect 1, wherein the bimodal polyethylene composition has a value of the weight average molecular weight (Mw) to number average molecular weight (Mn) ratio (Mw/Mn) that is greater than 5.00; a value of an z-average molecular weight (Mz) to weight average molecular weight (Mw) ratio (Mz/Mw) that is less than the Mw/Mn; or both the Mw/Mn greater than 5.00 and a Mz/Mw less than the Mw/Mn.

Aspect 13 provides a method of aspect 12, further comprising: forming a trim solution including at least the metallocene olefin polymerization catalyst, the biphenylphenol polymerization precatalyst of Formula I, or the biphenylphenol polymerization catalyst made from the biphenylphenol polymerization precatalyst of Formula I; and adding the trim solution to the single reactor to make at least a part of the bimodal polymerization catalyst system.

Aspect 14 provides a method of making the bimodal polymerization catalyst system of any one of aspects 1 to 11, the method comprising making the biphenylphenol polymerization catalyst by contacting, under activating conditions, the biphenylphenol polymerization precatalyst of Formula I with an activator.

Aspect 15 provides a method of aspect 14, wherein the activator is spray-dried on a silica support and the method comprises making the biphenylphenol polymerization catalyst by contacting, under activating conditions, the biphenylphenol polymerization precatalyst of Formula I with the supported spray-dried activator.

EXAMPLES

Bimodal polymerization catalyst systems including biphenylphenol polymerization catalysts made from the biphenylphenol polymerization precatalyst of Formula (I) and comparative bimodal polymerization catalyst systems including comparative catalysts (other than those made from bimodal polymerization precatalyst of Formula (I) were prepared as follows.

Biphenylphenol polymerization precatalyst of Formula (i) was prepared as follows. In a glove box, a 16 oz oven-dried glass jar was charged with hafnium chloride [HfCl4] (12.07 g, 37.7 mmol; available from Strem Chemical) and toluene (300 mL; available from Fisher Scientific) and a magnetic stir bar. The contents of the jar were cooled to approximately −30 degrees Celsius (° C.). The methylmagnesium bromide (56.6 mL of 2.6M solution in diethyl ether, 147 mmol; available from Millipore Sigma) was added and the solution was stirred for 15 minutes at −30° C. The jar was charged with a ligand of Formula A (56.00 g, 35.9 mmol). The ligand of Formula A was prepared as described in WO 2017/058, 981, and the entire contents of WO 2017/058,981 are incorporated herein by reference. The contents of the vial were allowed to stir for 3 hours as the solution gradually warmed to room temperature. The mixture was filtered and the solvent was removed in vacuo from the filtrate to obtain a gray powder (45 g, 71.0% yield). The presence of the biphenylphenol polymerization precatalyst of Formula (i) was confirmed by $^1H$ NMR analysis. $^1H$ NMR (400 MHz, Benzene-$d_6$) δ 8.19 (d, 2H), 8.01 (s, 2H), 7.99 (d, 2H), 7.89 (d, 2H), 7.74 (s, 2H), 7.64 (d, 2H), 7.55 (s, 2H), 7.51 (dd, 2H), 7.31 (dd, 2H), 7.06 (m, 2H), 3.68 (m, 2H), 3.42 (m, 2H), 1.79 (d, 2H), 1.67 (d, 2H), 1.60 (s, 18H), 1.47 (s, 6H), 1.42 (s, 6H), 1.35 (s, 6H), 1.33 — 1.25 (m, 26H), 1.25 (s, 18H), 0.93 (t, 6H), 0.92 (s, 18H), 0.59 (m, 4H), 0.10 (s, 6H), 0.07 (s, 6H), −0.82 (s, 6H).

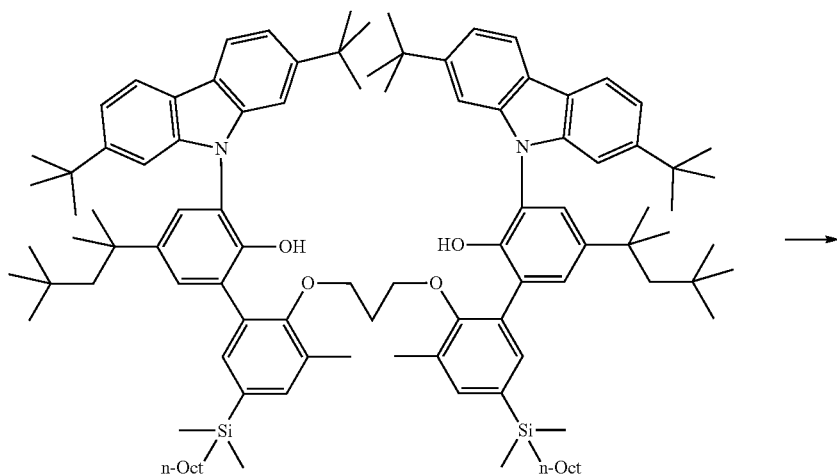

(Formula A)

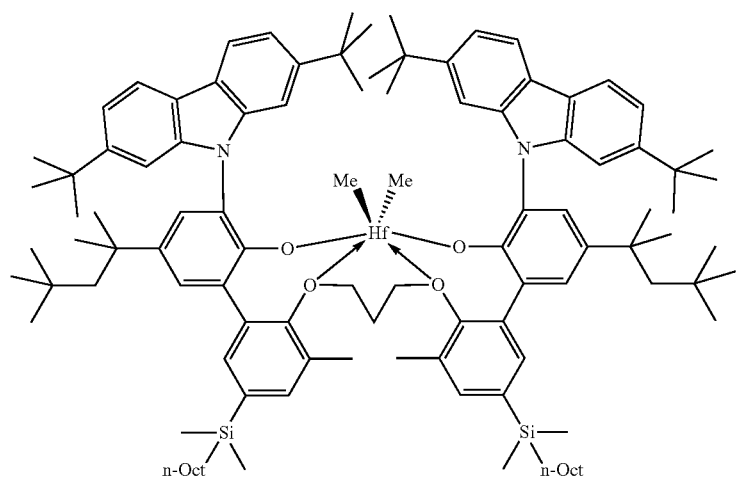

(Formula i)

As used herein, "Me" refers to methyl, "n-Oct" refers to n-$C_8H_{17}$, and "n-Pr" refers to n-$C_3H_7$.

Biphenylphenol polymerization precatalyst of Formula (ii) was prepared using the same components and methodology as biphenylphenol polymerization precatalyst of Formula (i), but with the use of zirconium chloride [ZrCl4] (15.0 g, 64.1 mmol) instead of hafnium chloride (99.9 g; 92.9% yield). The presence of biphenylphenol polymerization precatalyst of Formula (ii) was confirmed by $^1$H NMR analysis. $^1$H NMR (400 MHz, Benzene-$d_6$) δ 8.19 (d, 2H), 8.01 (s, 2H), 7.99 (d, 2H), 7.87 (d, 2H), 7.79 (d, 2H), 7.65 (d, 2H), 7.57 (d, 2H), 7.51 (dd, 2H), 7.30 (dd, 2H), 7.04 (m, 2H), 3.57 (m, 2H), 3.43 (m, 2H), 1.79 (d, 2H), 1.67 (d, 2H), 1.60 (s, 18H), 1.46 (s, 6H), 1.42 (s, 6H), 1.35 (s, 6H), 1.34 — 1.25 (m, 26H), 1.25 (s, 18H), 0.94 (t, 6H), 0.93 (s, 18H), 0.60 (m, 4H), 0.11 (s, 6H), 0.08 (s, 6H), −0.63 (s, 6H).

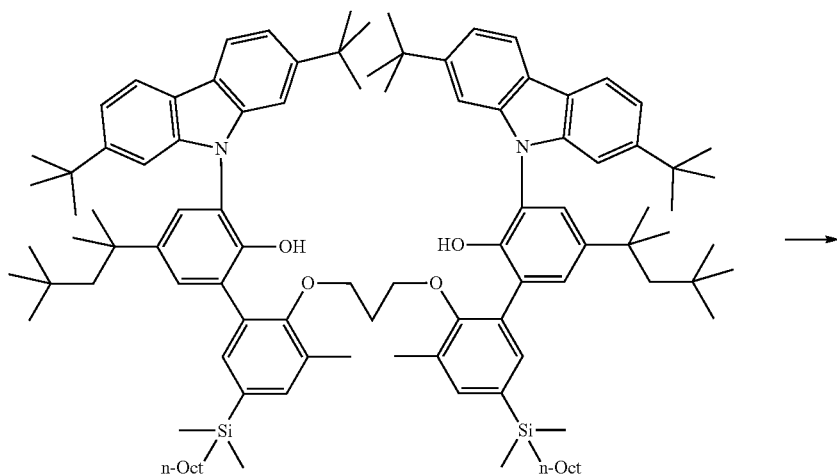

(Formula A)

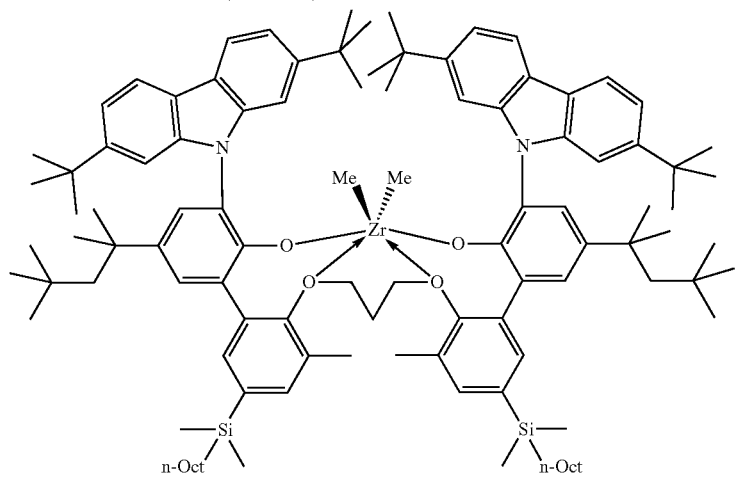

(Formula ii)

In various embodiments, the catalysts made from the precatalyst of Formula (i) and/or (ii) can be employed in the bimodal polymerization catalyst systems herein to make a high molecular weight polyethylene component in the bimodal polyethylene composition.

Polymerization precatalyst of Formula (iii) was prepared according to the method found in Huang, Rubin et al, Macromolecules (Washington, D.C., United States), 41(3), 579-590; 2008, the entire contents of Huang, Rubin et al, Macromolecules are incorporated herein by reference.

(Formula iii)

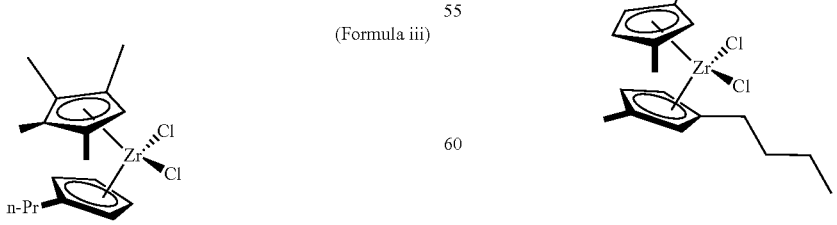

(Formula iv)

Comparative polymerization precatalyst of Formula (iv) can be prepared according to the method found in PCT Int. Appl. WO 2009/064404 (A2).

In various embodiments, the metallocene olefin polymerization precatalyst of Formula (iii) and/or Formula (iv) can be employed in the bimodal polymerization catalyst systems herein to make a low molecular weight polyethylene component in a bimodal polyethylene composition.

Comparative polymerization precatalyst of Formula (v) can be prepared according to the method found in PCT Int. Appl. WO 2009/064404 (A2). In various embodiments, the comparative polymerization precatalyst of Formula (v) can be employed in a bimodal polymerization catalyst system to make a comparative high molecular weight polyethylene component in a comparative bimodal polyethylene composition.

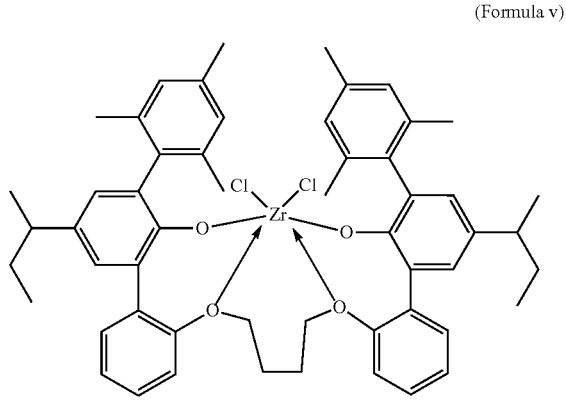

(Formula v)

The precatalysts of Formulas (i) and (ii) were activated as follows to make the activated biphenylphenol polymerization catalysts included in the bimodal polymerization catalyst systems of Examples 1-4 (EX1-4).

Example 1 employs a bimodal polymerization catalyst system A (including the precatalyst of Formula (ii) and the precatalyst of Formula (iii)) which was prepared as follows.

A trim solution of the precatalyst of Formula (ii) was prepared as follows. In a 1L cylinder measured 698 g of a solution of precatalyst of Formula (ii) (1.00 weight percent in methylcyclohexane, 539 ppm Zr). Connected the 1L cylinder to a 3785.41 cubic centimeter (cc)(28 gallon) cylinder, filled with about 8.60 kilograms (18.96 pounds) purified isopentane to produce a final concentration of 0.075 weight percent. Pressurized and purged cylinder three times with nitrogen. That is, in various embodiments, part or all of a catalyst system (e.g., the metallocene and/or the biphenylphenol polymerization precatalyst) is provided as a trim solution. For example, a portion of the metallocene catalyst may be provided as a trim solution. Alternatively, a portion of the biphenylphenol polymerization precatalyst may be provided as a trim solution.

A spray dried formulation of precatalyst of Formula (iii) was prepared as described in WO 2019190897 to make the activated and supported catalyst. The final spray-dried catalyst composition had a zirconium loading of 0.18 wt %, an aluminum loading of 16.7 wt %, and 2.5 wt % residual toluene.

For Example 1 the bimodal polymerization catalyst system A was employed as using the polymerization procedure described herein at a trim catalyst concentration of 0.075 weight percent based on a total weight of precatalyst of formula (ii), a spray dried catalyst feed rate of 26.6 cc/hour (hr), a trim catalyst feed rate of 24.9 cc/hr, an ethylene partial pressure of about 4.24 kilograms per square centimeter (60.3 Pounds per square inch absolute (PSIA)), a $C_6/C_2$ mole ratio of 0.0028, $H_2/C_2$ mole ratio of 0.0018, and isopentane concentration of 12.3 mole percent. Example 1 yielded a bimodal polyethylene composition at a production rate of about 11.89 kilograms/hour (26.2 pounds/hour) and a productivity of about 2515 kilograms polymer/kilograms catalyst (2515 pounds polymer/pounds catalyst).

Example 2 employs a bimodal polymerization catalyst system B (including the precatalyst of Formula (ii) and the precatalyst of Formula (iii)) which was prepared using the same methodology as the bimodal catalyst system A, but employed a spray dried formulation of precatalyst of Formula (iii) which had a composition of zirconium loading of 0.11 wt %, an aluminum loading of 16.9 wt %, and 2.1 wt % residual toluene, a spray dried catalyst feed rate of 65.9 cc/hr, a trim catalyst feed rate of 21.2 cc/hr, an ethylene partial pressure of 61.1 PSIA, a $C_6/C_2$ mole ratio of 0.0017, $H_2/C_2$ mole ratio of 0.0018, and isopentane concentration of 12.5 mole percent. Example 2 yielded a bimodal polyethylene composition at a production rate of about 8.84 kilograms/hour (19.5 pounds/hour) and a productivity of about 6667 kilograms polymer/kilograms catalyst (6667 pounds polymer/pounds catalyst).

Example 3 employed a bimodal polymerization catalyst system C (including a precatalyst of Formula (iii) and a spray dried catalyst of a mixture of Formula (ii) and Formula (iii)) present at the ratio in Table 1 which was prepared as follows.

A trim solution of the precatalyst of Formula (iii) was prepared using the same methodology as the trim solution of Example 1, but with the precatalyst of Formula (iii) instead of the precatalyst of Formula (ii) to produce a final concentration of 0.04 weight percent.

A spray dried catalyst made from the precatalyst of Formula (iii) and the precatalyst of Formula (ii), is formed as described in WO 2019190897 to make the activated spray-dried catalyst. In the formulation the precatalyst of Formula (ii) and the precatalyst of Formula (iii) are present in the mole ratio of 0.7:20, respectively. The final spray-dried catalyst composition had a zirconium loading of 0.19 wt %, an aluminum loading of 16.7 wt %, and 3.2 wt % residual toluene.

The bimodal polymerization catalyst system C was employed as using the polymerization procedure described herein at a trim catalyst concentration of 0.04 weight percent, a spray dried catalyst feed rate of 38.0 cc/hr, a trim catalyst feed rate of 106.0 cc/hr, an ethylene partial pressure of 35.0 PSIA, a $C_6/C_2$ mole ratio of 0.00097, $H_2/C_2$ mole ratio of 0.00174, and isopentane concentration of 13.9 mole percent. Example 3 yielded a bimodal polyethylene composition at a production rate of about 7.71 kilograms/hour (17.0 pounds/hour) and a productivity of about 1296 kilograms polymer/kilograms catalyst (1296 pounds polymer/pounds catalyst).

Example 4 employed a bimodal polymerization catalyst system D (including the precatalyst of Formula (i) and the precatalyst of Formula (iii)) which was prepared as follows.

A trim solution of the precatalyst of Formula (i) was prepared as follows. In a 1L cylinder, measured 350 g of a solution of precatalyst of Formula (i) (1.01 weight percent in methylcyclohexane, 1008 ppm Hf). Connected the 1 L cylinder to a 3785.41 cc (28 gallon) cylinder, filled with about 8.39 kilograms (18.5 pounds) purified isopentane to produce a final concentration of 0.04 weight percent. Pressurized and purged cylinder three times with nitrogen.

A spray dried formulation of precatalyst of Formula (iii) was prepared as described in WO 2019190897 to make the activated catalyst. The final spray-dried catalyst composition had a zirconium loading of 0.18 wt %, an aluminum loading of 16.7 wt %, and 2.5 wt % residual toluene.

The bimodal polymerization catalyst system D was employed as using the polymerization procedure described herein at a trim catalyst concentration of 0.04 weight percent, a spray dried catalyst feed rate of 24.0 cc/hr, a trim catalyst feed rate of 30.8 cc/hr, an ethylene partial pressure of 100.1 PSIA, a $C_6/C_2$ mole ratio of 0, $H_2/C_2$ mole ratio of 0.0022, and isopentane concentration of 9.1 mole percent. Example 4 yielded a bimodal polyethylene composition at a production rate of about 12.25 kilograms/hour (27.0 pounds/hour) and a productivity of about 2911 kilograms polymer/kilograms catalyst (2911 pounds polymer/pounds catalyst).

Comparative Example 1 employed a comparative bimodal polymerization catalyst system E (including catalysts made from precatalysts of Formula (iv) and Formula (v)) which was prepared as follows. The supported formulation of precatalyst of Formula (iv) and precatalyst of Formula (v) can be prepared according to the method found in PCT Int. Appl. WO 2009/064404 (A2). The bimodal polymerization catalyst system E was employed using the polymerization procedure found in PCT Int. Appl. WO 2009/064404 (A2).

Ethylene/1-hexene copolymerizations were conducted for each of Examples 1-4 using a gas phase fluidized bed copolymerization of ethylene and 1-hexene to produce an ethylene/1-hexene copolymer. A gas phase fluidized bed reactor was used which had a 0.35 m internal diameter and 2.3 m bed height and a fluidized bed composed of polymer granules. Fluidization gas was passed through the bed at a velocity of about 1.7 to 2.1 ft/s. The fluidization gas exited the top of the reactor and passed through a recycle gas compressor and heat exchanger before re-entering the reactor below a distribution grid. A constant fluidized bed temperature was maintained by continuously adjusting the temperature of the water on the shell side of the shell-and-tube heat exchanger. Gaseous feed streams of ethylene, nitrogen and hydrogen together with 1-hexene comonomer were introduced into a recycle gas line. The reactor was operated at a total pressure of about 2413 kilopascals (kPA) gauge and vented to a flare to control the total pressure. Individual flow rates of ethylene, nitrogen, hydrogen and 1-hexene were adjusted to maintain gas composition targets. Ethylene partial pressure, C6/C2 mol ratio, H2/C2 mol ratio and isopentane concentration were each set to the value in the examples. Concentrations of all gases were measured using an on-line gas chromatograph. The fluidized bed was maintained at constant height by withdrawing a portion of the bed at a rate equal to the rate of formation of particulate product. The slurry catalyst (spray dried precatalyst/catalyst as specified in Table 1) was fed to a catalyst injection tube where it was contacted inline with the trim solution (Trim precatalyst/catalyst as specified in Table 1) before being sprayed into the fluidized bed with isopentane and nitrogen carriers. The feed rate of slurry catalyst was adjusted to maintain the desired production rate and the feed rate of trim solution was adjusted to obtain the desired final resin flow Index in the resulting bimodal polymer. Product was removed semi-continuously via a series of valves into a fixed volume chamber. A nitrogen purge removed a significant portion of entrained and dissolved hydrocarbons in the fixed volume chamber. After purging, the product was discharged from the fixed volume chamber into a fiber pack for collection. The product was further treated with a small stream of humidified nitrogen to deactivate any trace quantities of residual catalyst and cocatalyst.

The results for EX1-4 and CE1 are shown in Tables 1 and 2 and described herein.

Mn (number average molecular weight) and Mw (weight average molecular weight), z-average molecular weight (Mz) were determined by gel permeation chromatography (GPC), as is known in the art.

Productivity (kilograms polymer/kilograms catalyst) was determined as the ratio of polymer produced to the amount of catalyst and activator added to the reactor.

TABLE 1

|  | CS | Trim precatalyst Formula | Spray dried precatalyst Formula | Formulated catalyst Mol Ratio | Mn (g/mol) | Mw (g/mol) | Mz (g/mol) |
| --- | --- | --- | --- | --- | --- | --- | --- |
| EX1 | A | Ii | iii | 100% iii | 22,684 | 238,625 | 1,523,950 |
| EX2 | B | Ii | iii | 100% iii | 24,454 | 218,937 | 945,368 |
| EX3 | C | Iii | ii/iii | 0.7:20 (ii/iii) | 30,958 | 309,716 | 2,543,935 |
| EX4 | D | I | iii | 100% iii | 12,170 | 529,748 | 2,645,720 |
| CE1 | E | None | iv/v | 99.6:0.4 (iv:v) | 28,242 | 125,147 | 769,345 |

TABLE 2

|  | CS | Mz to Mw ratio | Mw to Mn Ratio | Density (g/cm³) | I21 (dg/min) |
| --- | --- | --- | --- | --- | --- |
| EX1 | A | 6.39 | 10.52 | 0.945 | 6.64 |
| EX2 | B | 4.32 | 8.95 | 0.946 | 756 |
| EX3 | C | 8.21 | 10.00 | 0.949 | 7.93 |
| EX4 | D | 4.99 | 43.53 | 0.954 | 1.49 |
| CE1 | E | 4.43 | 6.15 | 0.938 | 28.25 |

As detailed in Tables 1 and 2, EX1-4 provide for bimodal polymerization catalyst system and resultant bimodal polymers having suitable properties. For instance, the bimodal polymerization catalyst systems of the disclosure produce bimodal polymers having high molecular weight components which have an improved (i.e., lower) molecular weight than high molecular weight components of bimodal polymers produced from comparative catalysts at similar conditions, for instance, as evidence by the polymer having an improved Mz to Mw ratio (i.e., a Mw to Mn ratio of greater than 5.00 and a value of Mz to Mw ratio that is less than a value of a Mw/Mn ratio). Namely, the biphenylphenol polymerization precatalyst of Formula I (such as the precatalyst of Formula (i) and/or (ii)) can be employed in bimodal polymerization catalyst system that lead to production of the desired high molecular weight component which has an improved (i.e., lower) molecular weight than bimodal polymers produced from comparative catalysts at similar conditions. Without wishing to be bound by theory, it has been suggested that a high molecular weight component with a value of Mw of less than 700,000 may improve the resin properties for certain applications. Notably, the improved Mw can be realized both when a biphenylphenol polymerization catalyst made from biphenylphenol polymerization precatalyst of Formula I is employed as a trim catalyst (EX1, EX2, EX4) in a bimodal catalyst system and when the catalyst made from the biphenylphenol polymerization precatalyst of Formula I is employed as a spray dried catalyst (EX3) in a bimodal catalyst system.

What is claimed is:

1. A bimodal polymerization catalyst system comprising:
a metallocene olefin polymerization catalyst; and
a biphenylphenol polymerization catalyst made from a biphenylphenol polymerization precatalyst of Formula I:

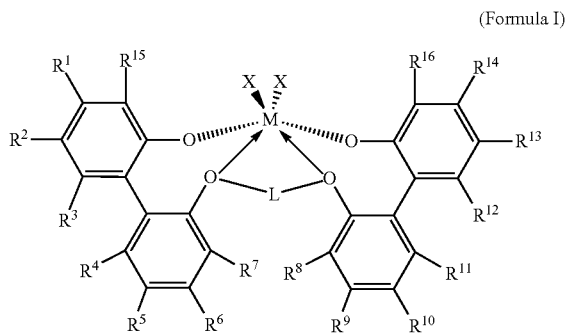

(Formula I)

wherein each of $R^7$ and $R^8$ is independently a $C_1$ to $C_{20}$ alkyl, aryl or aralkyl, halogen, or a hydrogen;
wherein each of $R^5$ and $R^{10}$ is independently a $C_1$ to $C_{20}$ alkyl, aryl, aralkyl, halogen, an alkyl-or aryl-substituted silyl, or a hydrogen;
wherein each of $R^2$ and $R^{13}$ is independently a $C_1$ to $C_{20}$ alkyl, aryl or aralkylor a hydrogen;
wherein each of $R^{15}$ and $R^{16}$ is independently a 2,7-disubstituted carbazol-9-yl;
wherein L is a saturated $C_2$-$C_3$ alkyl that forms a 2-carbon bridge or 3-carbon bridge between the two oxygen atoms to which L is bonded;
wherein each X is independently halogen, a hydrogen, a $(C_1$-$C_{20})$alkyl, a $(C_7$-$C_{20})$aralkyl, a $(C_1$-$C_6)$alkyl-substituted $(C_6$-$C_{12})$aryl, a $(C_1$-$C_6)$alkyl-substituted benzyl, or —$CH_2Si$ $(R^c)_3$, where $R^c$ is $C_1$-$C_{12}$ hydrocarbon;
wherein each of $R^1$, $R^3$, $R^4$, $R^6$, $R^9$, $R^{11}$, $R^{12}$, and $R^{14}$ is independently a hydrogen; and
wherein M is a heteroatom selected from a group consisting of Zr and Hf.

2. The bimodal polymerization catalyst system of claim 1, wherein each of $R^7$ and $R^8$ is a $C_1$ alkyl.

3. The bimodal polymerization catalyst system of claim 1, wherein each of $R^5$ and $R^{10}$ is a di-alkyl or tri-alkyl substituted silyl.

4. The bimodal polymerization catalyst system of claim 1, wherein each $R^2$ and $R^{13}$ is a 1,1,3,3-tetramethylbutyl.

5. The bimodal polymerization catalyst system of claim 1, wherein each of $R^{15}$ and $R^{16}$ is a 2,7-di-t-butylcarbazol-9-yl.

6. The bimodal polymerization catalyst system of claim 1, wherein L is a saturated $C_3$ alkyl.

7. The bimodal polymerization catalyst system of claim 1, wherein each X is a $C_1$ alkyl.

8. The bimodal polymerization catalyst system of claim 1, wherein M is Zr.

9. The bimodal polymerization catalyst system of claim 1, wherein M is Hf.

10. The bimodal polymerization catalyst system of claim 1, wherein the metallocene olefin polymerization catalyst is made from a metallocene precatalyst selected from the group consisting of:
(pentamethylcyclopentadienyl)(propylcyclopentadienyl) $MX_2$,
(tetramethylcyclopentadienyl)(propylcyclopentadienyl) $MX_2$,
(tetramethylcyclopentadienyl)(butylcyclopentadienyl) $MX_2$,
(methylcyclopentadienyl)(1,3-dimethyl-tetrahydroindenyl)$MX_2$,
(cyclopentadienyl)(1,3-dimethyl-tetrahydroindenyl)$MX_2$,
(cyclopentadienyl)(4,7-dimethylindenyl)$MX_2$,
(cyclopentadienyl)(1,5-dimethylindenyl)$MX_2$,
(cyclopentadienyl)(1,4-dimethylindenyl)$MX_2$,
$Me_2Si$(indenyl)$_2MX_2$,
$Me_2Si$(tetrahydroindenyl)$_2MX_2$,
(n-propyl cyclopentadienyl)$_2MX_2$,
(n-butyl cyclopentadienyl)$_2MX_2$,
(1-methyl, 3-butyl cyclopentadienyl)$_2MX_2$,
$HN(CH_2CH_2N(2,4,6$-$Me_3$phenyl))$_2MX_2$,
$HN(CH_2CH_2N(2,3,4,5,6$-$Me_5$phenyl))$_2MX_2$,
(butyl cyclopentadienyl)$_2MX_2$,
(propyl cyclopentadienyl)$_2MX_2$, and mixtures thereof,
wherein M is Zr or Hf, and X is selected from F, Cl, Br, I, Me, benzyl, $CH_2SiMe_3$, or $C_1$ to $C_5$ alkyls or alkenyls.

11. The bimodal polymerization catalyst system of claim 1, further comprising a silica support, which supports: (a) the metallocene olefin polymerization catalyst but not the biphenylphenol polymerization catalyst made from biphenylphenol polymerization precatalyst of Formula I, (b) the biphenylphenol polymerization catalyst made from the biphenylphenol polymerization precatalyst of Formula I, but not the metallocene olefin polymerization catalyst, or (c) a combination the metallocene olefin polymerization catalyst and the biphenylphenol polymerization catalyst made from a biphenylphenol polymerization precatalyst of Formula I.

12. A method of making the bimodal polymerization catalyst system of claim 1, the method comprising making the biphenylphenol polymerization catalyst by contacting, under activating conditions, the biphenylphenol polymerization precatalyst of Formula I with an activator.

13. The method of claim 12, wherein the activator is spray-dried on a silica support and the method comprises making the biphenylphenol polymerization catalyst by contacting, under activating conditions, the biphenylphenol polymerization precatalyst of Formula I with supported spray-dried activator.

* * * * *